United States Patent
Kim

(10) Patent No.: US 10,854,088 B2
(45) Date of Patent: Dec. 1, 2020

(54) APPARATUS AND METHOD FOR CONTROLLING PLATOONING

(71) Applicants: HYUNDAI MOTOR COMPANY, Seoul (KR); KIA MOTORS CORPORATION, Seoul (KR)

(72) Inventor: Dong Hyuk Kim, Hwaseong-si (KR)

(73) Assignees: HYUNDAI MOTOR COMPANY, Seoul (KR); KIA MOTORS COMPANY, Seoul (KR)

( * ) Notice: Subject to any disclaimer, the term of this patent is extended or adjusted under 35 U.S.C. 154(b) by 233 days.

(21) Appl. No.: 16/018,104

(22) Filed: Jun. 26, 2018

(65) Prior Publication Data
US 2019/0259286 A1    Aug. 22, 2019

(30) Foreign Application Priority Data
Feb. 19, 2018    (KR) ........................ 10-2018-0019322

(51) Int. Cl.
| | | |
|---|---|---|
| G05D 1/00 | (2006.01) | |
| G08G 1/00 | (2006.01) | |
| G05D 1/02 | (2020.01) | |
| G08G 1/0968 | (2006.01) | |

(52) U.S. Cl.
CPC ............ *G08G 1/22* (2013.01); *G05D 1/0278* (2013.01); *G05D 1/0295* (2013.01); *G08G 1/0968* (2013.01)

(58) Field of Classification Search
CPC ...... G08G 1/22; G08G 1/0968; G05D 1/0295; G05D 1/0278; G05D 1/00; B60W 30/165; G06F 17/00

USPC ................................ 701/2, 23; 340/436, 439
See application file for complete search history.

(56) References Cited

U.S. PATENT DOCUMENTS

| | | | | |
|---|---|---|---|---|
| 6,498,976 | B1* | 12/2002 | Ehlbeck | B60G 17/0162 |
| | | | | 701/70 |
| 9,423,794 | B2* | 8/2016 | Lind | G05D 1/0278 |
| 2006/0208923 | A1* | 9/2006 | Tauchi | G08G 1/161 |
| | | | | 340/902 |
| 2010/0256852 | A1* | 10/2010 | Mudalige | G08G 1/163 |
| | | | | 701/24 |
| 2013/0116861 | A1* | 5/2013 | Nemoto | B60W 30/16 |
| | | | | 701/2 |
| 2013/0211624 | A1* | 8/2013 | Lind | G05D 1/021 |
| | | | | 701/2 |

(Continued)

FOREIGN PATENT DOCUMENTS

| | | |
|---|---|---|
| JP | 2006-254215 A | 9/2006 |
| KR | 10-0957137 B1 | 5/2010 |

(Continued)

*Primary Examiner* — Shardul D Patel
(74) *Attorney, Agent, or Firm* — Morgan, Lewis & Bockius LLP

(57) ABSTRACT

A platooning control apparatus includes: a communication device configured to perform communication between a leading vehicle and following vehicles, which follow the leading vehicle, in a platoon; and a controller configured to control platooning by requesting checking of functions of the following vehicles through the communication device after the platoon is formed, by identifying whether a specific function among checked functions of the following vehicles operates, and by determining whether the platoon is maintained according to an identification result.

20 Claims, 4 Drawing Sheets

(56) References Cited

U.S. PATENT DOCUMENTS

| | | | | |
|---|---|---|---|---|
| 2017/0329348 A1* | 11/2017 | Li | ........................ | G05D 1/0212 |
| 2017/0349176 A1* | 12/2017 | Alden | .................. | G05D 1/0293 |
| 2018/0037227 A1* | 2/2018 | D'sa | ..................... | B60W 30/16 |
| 2018/0211546 A1* | 7/2018 | Smartt | ................. | G05D 1/0088 |
| 2018/0348791 A1* | 12/2018 | Hendrickson | ........ | G05D 1/0027 |
| 2019/0073909 A1* | 3/2019 | Neubecker | ............... | B60Q 1/30 |
| 2019/0206260 A1* | 7/2019 | Pilkington | ............ | G05D 1/0295 |

FOREIGN PATENT DOCUMENTS

| | | |
|---|---|---|
| KR | 10-2015-0102837 A | 9/2015 |
| KR | 10-2016-0037544 A | 4/2016 |
| KR | 10-2016-0091117 A | 8/2016 |
| KR | 2016-0139907 A | 12/2016 |
| WO | 2010/098554 A2 | 9/2010 |

* cited by examiner ated technical objects will become apparent to those skilled in the art from the following description.

APPARATUS AND METHOD FOR CONTROLLING PLATOONING

CROSS-REFERENCE TO RELATED APPLICATION

This application is based on and claims the benefit of priority to Korean Patent Application No. 10-2018-0019322, filed on Feb. 19, 2018, in the Korean Intellectual Property Office, the disclosure of which is incorporated herein in its entirety by reference.

TECHNICAL FIELD

The present disclosure relates to an apparatus and a method for controlling platooning by which synchronization of functional operations of all platooning vehicles in a platoon is checked when a platoon for platooning is formed.

BACKGROUND

Platooning a scheme in which a movement of a leading vehicle and situation information are exchanged through real-time communication between vehicles, and accordingly, several vehicles are driven together while maintaining specific intervals with preceding vehicles. Because the vehicles travel while maintaining a specific interval with the leading vehicle during the platooning, the air resistance of the following vehicles decreases to reduce fuel efficiency, and the danger of an accident decreases.

The related art suggests a technology of sharing and initiating times of all the vehicles in the platoon after the platoon is formed (created). According to the related art, platoon is formed immediately after communication is linked between the vehicles while the functions of the vehicles of the initial platooning not checked. Accordingly, the platooning is released when an error in the vehicle-to-vehicle distances or a communication error is generated during the platooning.

Further, because the concentrations of the drivers deteriorate during the platooning, it is difficult for the drivers to properly cope with an error of a functional operation of the platooning vehicle when the error is generated, which may cause a big accident. That is, according to the related art, because the platoon is initially formed while the functions of the platooning vehicles are checked, there is a danger of an accident due to an error of a functional operation of the vehicle during the platooning.

SUMMARY

The present disclosure provides an apparatus and a method for controlling platooning by which synchronization of functional operations of all platooning vehicles in a platoon is checked when a platoon for platooning is formed.

The technical objects of the present disclosure are not limited to the above-mentioned one, and the other unmentioned technical objects will become apparent to those skilled in the art from the following description.

In accordance with an aspect of the present disclosure, a platooning control apparatus includes: a communication device configured to perform communication between a leading vehicle and following vehicles, which follow the leading vehicle, in a platoon; and a controller configured to control platooning by requesting checking of functions of the following vehicles through the communication device after the platoon is formed, by identifying whether a specific function among the checked functions of the following vehicles operates, and by determining whether the platoon is maintained according to an identification result.

The specific function may include lamps, deceleration, acceleration, steering, and an automatic platooning releasing function.

The controller may determine whether an operation of a function of the vehicle is normal, by transmitting a lamp operation command to the following vehicles through the communication device and by identifying lamp operation time points of the following vehicles according to the lamp operation command.

The controller may determine whether the operation of the function of the vehicle is normal, by decelerating the host vehicle by controlling a vehicle controller, and by identifying deceleration time points of the following vehicles and vehicle-to-vehicle distances between the following vehicles and preceding vehicles according to the deceleration of the host vehicle are within allowable ranges.

The controller may determine whether the operation of the function of the vehicle is normal, by accelerating the host vehicle by controlling a vehicle controller, and by identifying acceleration time points of the following vehicles and vehicle-to-vehicle distances between the following vehicles and preceding vehicles according to the acceleration of the host vehicle are within allowable ranges.

The controller may determine whether the operation of the function of the vehicle is normal, by controlling steering of the host vehicle through the vehicle controller and identifying steering responsiveness of the following vehicles to a steering control of the host vehicle.

The controller may transmit a platooning releasing command to the following vehicles through the communication device and then determine whether the operation of the function of the vehicle is normal according to whether completion of release of the platooning is received from the following vehicles within a predetermined time.

The controller may transmit the platooning releasing command when the operation of the function of the vehicle is abnormal, and share a reason for the release of the platooning with the following vehicles.

The platooning control apparatus may further include a display configured to output various pieces of information, and the controller may display the reason for the release of the platooning on the display.

The communication device may use vehicle-to-everything (V2X) communication.

In accordance with another aspect of the present disclosure, a method for controlling platooning includes: starting, by a controller, a platooning initializing mode after a platoon is formed between a leading vehicle and following vehicles which follow the leading vehicle; requesting, by the controller, checking of functions of following vehicles in the platooning initializing mode and identifying whether a specific function among the checked functions of the following vehicles operates; and controlling, by the controller, platooning by determining whether the platoon is maintained according to an identification result of whether the specific function of the following vehicles operates.

The specific function may include lamps, deceleration, acceleration, steering, and an automatic platooning releasing function of a vehicle.

The identifying of whether the specific function is operated may include determining whether an operation of a function of the vehicle is normal, by transmitting a lamp operation command to the following vehicles through the communication device and by identifying lamp operation time points of the following vehicles according to the lamp operation command.

The identifying of whether the specific function is operated may include determining whether the operation of the function of the vehicle is normal, by decelerating the host vehicle by controlling a vehicle controller, and by identifying deceleration time points of the following vehicles and vehicle-to-vehicle distances between the following vehicles and preceding vehicles according to the deceleration of the host vehicle are within allowable ranges.

The identifying of whether the specific function is operated may include determining whether the operation of the function of the vehicle is normal, by accelerating the host vehicle by controlling a vehicle controller, and by identifying acceleration time points of the following vehicles and vehicle-to-vehicle distances between the following vehicles and preceding vehicles according to the acceleration of the host vehicle are within allowable ranges.

The identifying of whether the specific function is operated may include determining whether the operation of the function of the vehicle is normal, by controlling steering of the host vehicle through the vehicle controller and identifying steering responsiveness of the following vehicles to a steering control of the host vehicle.

The identifying of whether the specific function is operated may include transmitting a platooning releasing command to the following vehicles through the communication device and then determining whether the operation of the function of the vehicle is normal according to whether completion of release of the platooning is received from the following vehicles within a predetermined time.

The method may further include, after the identifying of whether the specific function is operated, releasing platooning by transmitting a platooning releasing command to the following vehicles when operation of the function of the vehicle is abnormal.

The releasing of the platooning may include transmitting a reason for the release of the platooning when the platooning releasing command is transmitted and sharing the reason for the release of the platooning with the following vehicles.

The releasing of the platooning may include displaying the reason for the release of the platooning on the display.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
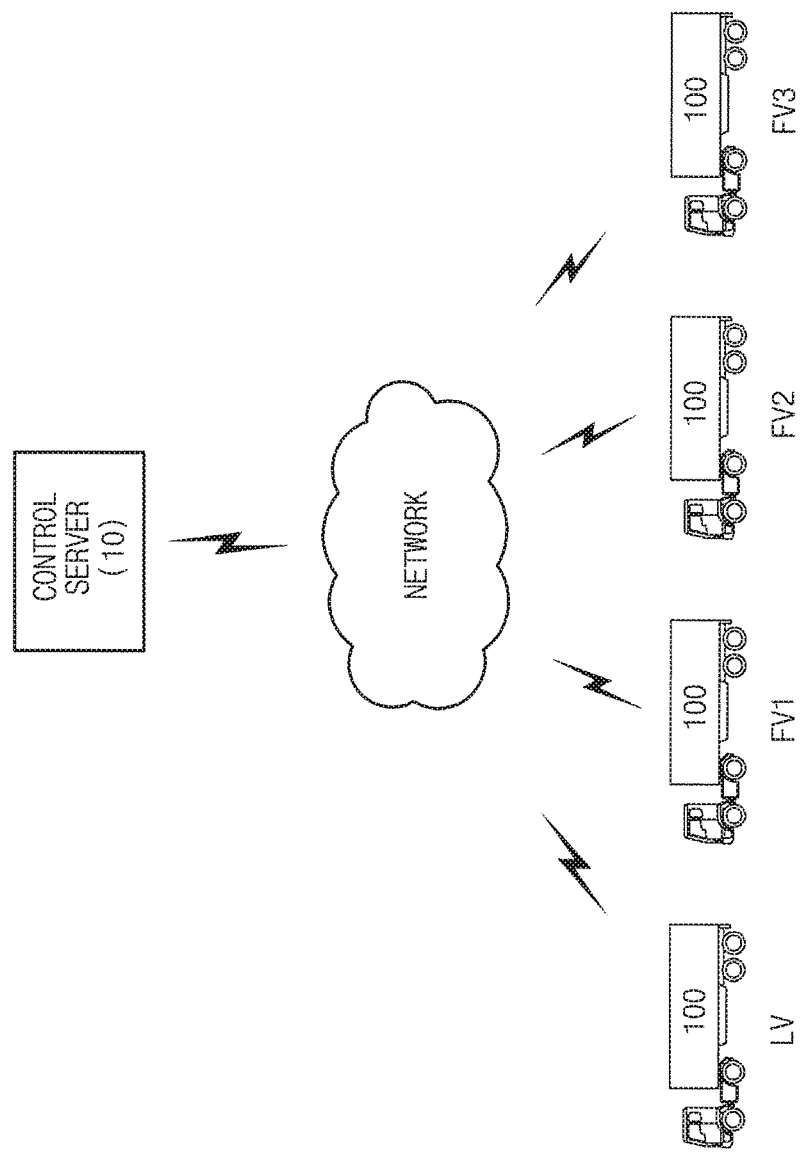
FIG. 1 is a diagram schematically illustrating a platooning service system according to an embodiment of the present disclosure.

Hereinafter, exemplary embodiments of the present disclosure will be described in detail with reference to the accompanying drawing Throughout the specification, it is noted that the same or like reference numerals denote the same or like components even though they are provided in different drawings. Further, in the following description of the present disclosure, a detailed description of known functions and configurations incorporated, herein will be omitted when it may make the subject matter of the present disclosure rather unclear.

In addition, terms, such as first, second, A, B, (a), (b) or the like may be used herein when describing components of the present disclosure. The terms are provided only to distinguish the elements from other elements, and the essences, sentences, orders, and numbers of the elements are not limited by the terms. In addition, unless defined otherwise, all terms used herein, including technical or scientific terms, have the same meanings as those generally understood by those skilled in the art to which the present disclosure pertains. The terms defined in the generally used dictionaries should be construed as having the meanings that coincide with the meanings of the contexts of the related technologies, and should not be construed as ideal or excessively formal meanings unless clearly defined in the specification of the present disclosure.

In order to solve a conventional problem of not being able to prevent an accident due to an operational error of a function of a vehicle, which is caused as platooning is performed without checking of a function of the vehicle for platooning (autonomous driving) when a platooning service is used, the present disclosure prevents an accident due to an operational error of a function in advance by checking a functional operation (or a state of a vehicle at the initial state of platooning) of the vehicle and finally approving final formation of platooning when the platooning is formed.

In general, platooning refers to driving of vehicles that is made while one leading vehicle LV and one or more following vehicles FVs form a platoon (group). In the specification, the leading vehicle LV refers to a foremost vehicle of a line (a platooning line) of vehicles that platoon, the following vehicle(s) FV is a vehicle that follows the leading vehicle LV, and a preceding vehicle refers to a vehicle that is immediately before a vehicle (host vehicle).

FIG. 1 is a diagram schematically illustrating a platooning service system according to an embodiment of the present disclosure.

As illustrated in FIG. 1, a platooning service system includes a control server 10 and a platooning control apparatus 100 that are connected through wired/wireless communication. The wired/wireless communication technologies may include the wired communication technologies, such as a local area network (LAN), a wide area network (WAN), and Ethernet, and the wireless communication technologies, such as Wireless Fidelity (Wi-Fi), Long Term Evolution (LTE), Bluetooth, and Vehicle-to-Everything (V2X).

The platooning control apparatus 100 is an on-board unit (OBU) mounted on a vehicle. The platooning control apparatus 100 registers a vehicle in the control server 10 according to a predetermined vehicle registration procedure to use a platooning service. The platooning control apparatus 100 supports communication between vehicles LV, FV1, FV2, and FV3 that use a platooning service. That is, the platooning control apparatus 100 supports communication between vehicles LV, FV1, FV2, and FV3 that are registered in the control server 10. The platooning control apparatus 100 exchanges driving information (travel information) of the vehicle with the other vehicles in the platoon (group).

The control server 10 may manage and control the vehicles LV, FV2, and FV3 that are registered in the platooning service. The control server 10 may collects vehicle information (points of departure, destinations, vehicle numbers, and the like) of the vehicles LV, FV1, FV2, and FV3 that are registered in the platooning service. The control server 10 forms a platoon (group) with two or more vehicles LV, FV1, FV2, and FV3 that will perform platooning based on the collected vehicle information. The control server 10 may select a leader vehicle (a leading vehicle LV) when platooning is formed.

Although not illustrated in the drawings, a road side unit (RSU) may be disposed between the control server 10 and the platooning control apparatus 100. The road side unit is installed around a road to support communication with vehicles and communication with other road side units. The road side unit includes a memory that stores a routing table (including location information and timestamp information of surrounding vehicles) and a map, one or more sensors installed around a road to detect (sense) a surrounding situation of the road, and an electronic control unit (ECU) that controls the sensors. The road side unit transmits information on a surrounding situation of a road acquired by using the one or more sensors to the control server 10 and/or the platooning control apparatus 100.

Figure 2:
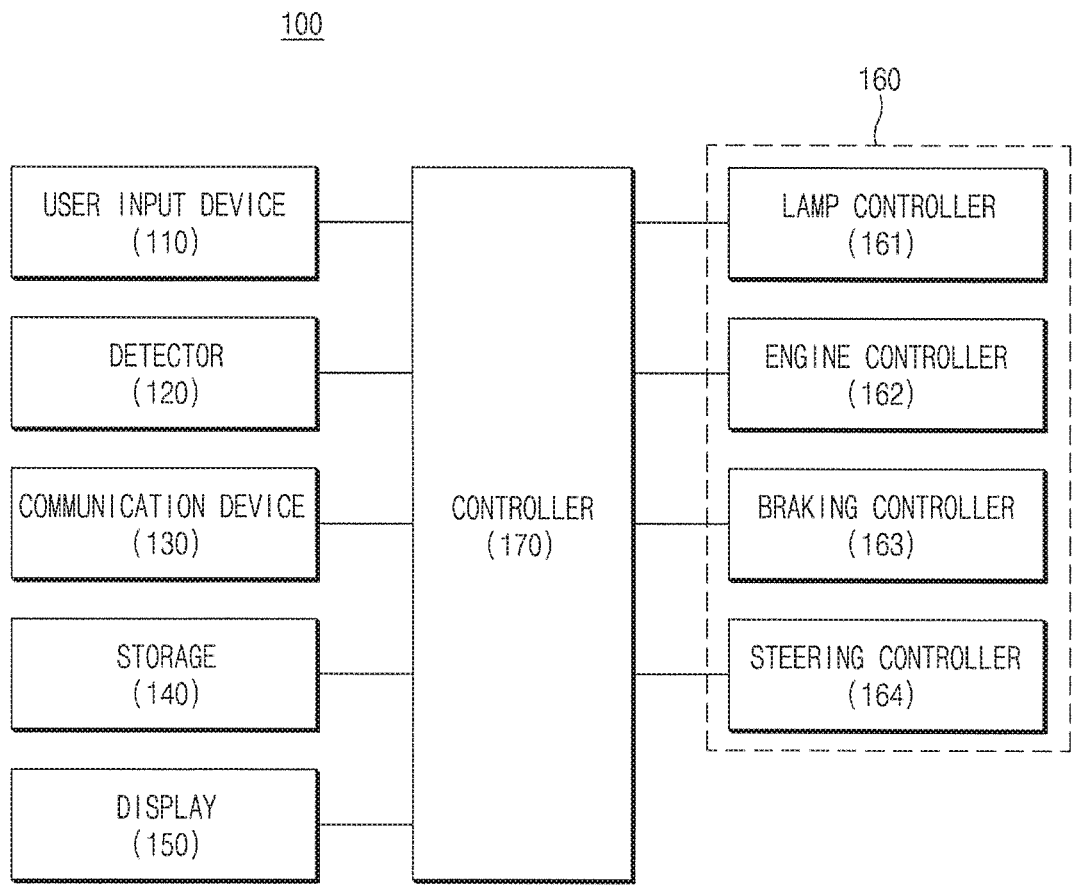
FIG. 2 is a block diagram of an apparatus for controlling platooning according to an embodiment of the present disclosure.

FIG. 2 illustrates a block diagram of an apparatus for controlling platooning according to an embodiment of the present disclosure.

As illustrated in FIG. 2, the platooning control apparatus 100 includes a user input device 100, a detector 120, a communication device 130, a storage 140, a display 150, vehicle controller 160, and a controller 170.

The user input device 110 generates input data according to a manipulation of the user. The user input device 110 receives information related to a cargo box from the user and transmits the information to the controller 170. The cargo box related information (cargo box information) includes the type of a cargo box, the size (the height, the width, the length, and the like) of the cargo box, and the kind of cargo. The user may input a point of departure and a destination, or destination information through the user input device 110.

Further, the user input device 110 may include a separate switch (driver switch) that generates a signal (command) such as a request for platooning and an approval of platooning. The user may manipulate the corresponding switch to make a request for platooning or approve the platooning for the request for the platooning.

The user input device 110 is a hardware device and may include one or more of a keypad, a dome switch, a touchpad (a pressure type or an electrostatic type), a jog wheel, and a jog switch.

The detector 120 detects driving (travel) information of a host vehicle, surrounding environment information, and surround vehicle information. The driving information of the host vehicle includes a location (vehicle location), a driving speed, and a steering angle of the host vehicle, and the surrounding vehicle information includes relative speeds, relative distances, and lane information of the surrounding vehicles with reference to the host vehicle.

The detector 120 includes a global positioning system (GPS) receiver, a speed sensor, an acceleration sensor, a light detection and ranging (LiDAR) system, a radio detecting and ranging (radar) system, an ultrasonic sensor, and an image sensor.

The detector 120 receives a signal transmitted from the GPS satellites through the GPS receiver, and calculates (detects) a location of the host vehicle by using the received signal. The detector 120 may include two or more GPS receivers.

The detector 120 may detect a speed and an acceleration (deceleration) of the vehicle through the sensors (a speed sensor, an acceleration sensor, and the like) mounted on the vehicle and the electronic control unit (ECU) mounted on the vehicle. Further, the detector 120 detects vehicle-to-vehicle distances between the host vehicle and the surrounding vehicles by using a distance sensor, such as the LiDAR system and the radar system. For example, the detector 120 detects a vehicle-to-vehicle distance between the host vehicle and the preceding vehicle and/or a vehicle-to-vehicle distance between the host vehicle and the following vehicle.

The detector 120 is a hardware device and acquires an image (e.g., a front image, a rear image, and/or a side image) around the vehicle through one or more image sensors (cameras). Because the image acquired through the image sensors are processed and analyzed, the surrounding environment information and the lane information of the vehicle are detected.

Here, the image sensor may be realized by a charge coupled device (COD) image sensor, a complementary metal oxide semiconductor (CMOS) image sensor, a charge priming device (CPD) image sensor, a charge injection device (CID) image sensor, and the like.

The communication device 130 performs communication with devices, such as an electronic control unit (ECU) mounted on the vehicle, the platooning control apparatuses mounted on the other vehicles (e.g., the preceding vehicles, the leading vehicle, the rear vehicle, and/or the following vehicles), mobile terminals (e.g., a smartphone, a computer, a notebook, and a tablet), and the control server 10.

The communication device 130 may receive a map, road information, traffic situation information, and platooning related information provided from the control server 10.

The communication device 130 is a hardware device capable of transmitting an analog or digital signal over wire or wirelessly and may include one or more components that enable communication with an external device. Examples of the communication device 130 include Bluetooth devices, infrared devices, modem, network card (using Ethernet), smartphone, Wi-Fi devices (using a Wi-Fi router), etc.

The communication device 130 may use an in-vehicle network (IVN), vehicle-to-everything (V2X) communication, and/or wireless communication. The in-vehicle communication may include controller area network (CAN) communication, media oriented systems transport (MOST) communication, local interconnect network (LIN) communication, or X-by-Wire (Flexray) communication. The V2X communication may be realized by vehicle-to-vehicle (V2V) communication, and/or vehicle-to-infrastructure (V2I) communication. The wireless communication may be realized by at least one of the communication technologies, such as the wireless internet (e.g., Wi-Fi), short-range communication (e.g., Bluetooth, ZigBee, and infrared ray communication) and mobile communication.

The storage 140 is a hardware device and may store software programmed to allow the controller 170 to perform a specific operation. Further, the storage 140 may store a map, road information, vehicle information, and cargo box information, and may temporarily store input/output data of the controller 170.

The storage 140 may be implemented by at least one of storage media such as a flash memory, a hard disk, a secure digital (SD) card, a random access memory (RAM), a read only memory (ROM), an erasable programming ROM (EPROM), and a web storage The display 150 is a hardware device and outputs a state and a result according to an operation of the controller 170.

The display 150 displays a driving speed, a residual amount of fuel, road guide information, a map, platooning related information, and the like.

The display 150 may include any one of a liquid crystal display (LCD), a thin film transistor-liquid crystal display (TFT-LCD), an organic light-emitting diode (OLED) display, a flexible display, a 3D display, a transparent display, a head-up display (HUD), and a cluster.

The display 150 may further include a sound output module, such as a speaker, which may output audio data. For example, the display 150 may display road guide information, and a voice signal (audio signal) may be output through a speaker Further, the display 150 may be realized by a touchscreen coupled to a touch sensor, and, may be used as an input device as well as an output device. The touch sensor may include a touch film or a touchpad.

The vehicle controller 160 includes a lamp controller 161, an engine controller 162, a braking controller 163, and a steering controller 164.

The lamp controller 161 drives direction switching (left turn or right turn) signal lamps (turn signal lamps), stop signal lamps (stop lamps), and platooning mode signal lamps.

The engine controller 162 is an actuator that controls an engine of the vehicle, and controls an acceleration of the vehicle. The engine controller 162 is realized by an engine management system (EMS). The engine controller 162 controls driving torque of the engine according to information on a location of an accelerator pedal, which is output from the acceleration pedal location sensor. The engine controller 162 controls an output of the engine to follow a driving speed of the vehicle, which is requested by the controller 170 during autonomous driving (platooning).

The braking controller 163 is an actuator that controls a deceleration of the vehicle, and may be realized by an electronic stability controller (ESC). The braking controller 163 controls a braking force to follow a target speed that is requested by the controller 170 during autonomous driving. Accordingly, the braking controller 163 may decelerate the vehicle by controlling a speed of the vehicle.

The steering controller 164 is adapted to control steering of the vehicle, and controls transverse movement of the vehicle. The steering controller 164 may be realized by a motor driven power steering (MDPS) system.

The controller 170 controls an overall operation of the platooning control apparatus 100. The controller 210 may include at least one of an application specific integrated circuit (ASIC), a digital signal processor (DSP), programmable logic devices (PLDs), field programmable gate arrays (FPGAs), a central processing unit (CPU), microcontrollers, and microprocessors.

The controller 170 transmits a platooning request message to the control server 10 through the communication device 130. That is, the controller 170 requests a platooning service from the control server 10. The control server 10 collects vehicle information from the vehicles that requested a platooning service, and forms a platoon with two or more vehicles based on the collected vehicle information. Then, the control server 10 may select a leader vehicle in the platoon. When the platoon is completely formed, the control server 10 transmits platooning approval information and information (platooning information) on the formed platoon to the vehicles in the platoon. Although it is disclosed in the embodiment that the control server 10 forms a platoon, the present disclosure is not limited thereto but the leading vehicle (the leader vehicle) LV may form a platoon according to a request for platooning of the surrounding vehicles.

When the platooning information is received, that is, when the formation of the platooning is completed, the controller 170 initiate platooning. Here, the initiation of the platooning refers to a process of checking synchronization of a functional operation of the vehicles (the leading vehicle and the following vehicles) in the platoon after the platoon is formed.

When the host vehicle is a leading vehicle LV, the controller 170 transmits a check command to the following vehicles FVs through the communication device 130. When the host vehicle is a following vehicle FV, the controller 170 transmits a function check result (a function operation time point and a vehicle-to-vehicle distance from the preceding vehicle) according to a request for check of the leading vehicle LV.

The controller 170 of the leading vehicle LV may check synchronization of operations of lamps, deceleration operations, acceleration operations, steering control operations, and emergency situation mode operations of the one or more following vehicles FVs. The controller 170 checks functional operations of the following vehicles FVs, and when there is no problem, finally approves formation of a platoon and performs platooning.

Hereinafter, a platooning initializing process will be described in more detail.

The controller 170 of the leading vehicle LV transmits lamp checking commands for the turn signal lamps and the stop lamps to the following vehicles FV at the same time point. When receiving a lamp checking command from the leading vehicle LV, the controllers 170 of the following vehicles FVs operate the turn signal lamps and the stop lamps by controlling the lamp controller 161, and transmit checking results including an operation time point and/or an operation normality to the leading vehicle LV. When receiving the checking results of the following vehicles FVs through the communication device 130, the controller 170 of the leading vehicle LV determines whether the operations of the lamps of the following vehicles FVs are normal based on the checking results. For example, the controller 170 of the leading vehicle LV determines that the operations of the lamps of the follow/following vehicles FVs are normal when the operation time points of the lamps of the following vehicles FVs are within a specific time (e.g., seconds) from the operation of the lamp of the leading vehicle LV.

The controller 170 of the leading vehicle LV rapidly decelerates a driving speed of the host vehicle at a predetermined deceleration (e.g., −3 m/s$^2$) by controlling the braking controller 163 when the checking results of the synchronizations of the operations of the lamps of all the platooning vehicles are normal. The controller 170 of the leading vehicle LV determines normality by identifying braking time points and vehicle-to-vehicle distances are within allowable ranges when receiving driving infatuation (checking result) including the braking operation time points (braking time points) and the vehicle-to-vehicle distances from the following vehicles FVs. For example, when the leading vehicle LV rapidly decelerates by 10 kph, the controllers 170 of the following vehicles FVs detect the deceleration of the preceding vehicles (including the leading vehicle) through the detector 120 and detect braking time points and vehicle-to-vehicle distances while braking the host vehicles through the braking controller 163. The controllers 170 of the following vehicles FVs transmit the braking time points and the vehicle-to-vehicle distances from the preceding vehicles, which were detected, to the leading vehicle LV. The controller 170 of the leading vehicle LV determines that the braking functions of the following vehicles FVs are normal when the braking time points of the following vehicles FVs are within 50 ms from the braking time point of the leading vehicle LV and the vehicle-to-vehicle distances from the preceding vehicles are more than 5 m.

If the synchronizations of the deceleration functions of all the platooning vehicles are determined, to be normal, the controller 170 of the leading vehicle LV rapidly decelerates the driving speed of the host vehicle to a predetermined acceleration (e.g., 3 m/s$^2$) by controlling the engine controller 162 to check the acceleration functions of all the platooning vehicles. When detecting rapid accelerations of the preceding vehicles (including the leading vehicle) through the detector 120, the controllers 170 of the following vehicles FVs accelerate the host vehicles by controlling the engine controller 162 and detect acceleration time points and vehicle-to-vehicle distances from the preceding vehicles. The controllers 170 of the following vehicles FVs transmit the acceleration time points and the vehicle-to-vehicle distances from the preceding vehicles, which were detected, to the leading vehicle LV. When the detected acceleration time point is within 200 ms from an accident time point of the leading vehicle LV and the detected vehicle-to-vehicle distance is more than 5 m, the controller 170 of the leading vehicle LV determines that the synchronization of the acceleration operations is normal (has no problem).

If it is determined that the synchronizations of the acceleration functions of all the platooning vehicles are normal, the controller 170 of the leading vehicle LV controls the steering of the host vehicle to a predetermined steering angle by controlling the steering controller 164. That is, the controller 170 controls the host vehicle LV to travel while steering in an S shape in the driving lane. The controllers 170 of the following vehicles FVs detect steering (change of travel directions) of the preceding vehicles (including the leading vehicle) through the detector 120, and accordingly, control the steering of the host vehicles by controlling the steering controllers 164. The controllers 170 of the following vehicles FVs transmit information, such as steering angles and steering time points according to control of steering to the leading vehicle LV. The controller 170 of the leading vehicle LV identifies the steering responsiveness of the following vehicles based on the steering angles and the steering time points transmitted from the following vehicles FVs. In other words, the controller 170 of the leading vehicle LV determines whether the synchronizations of the steering functions of all the platooning vehicles are normal by identifying whether the following vehicles FVs travel in an S shape.

The controller 170 of the leading vehicle LV checks synchronization of operations of the emergency situation mode when the synchronization of the steering functions of all the platooning vehicles is normal. The controller 170 of the leading vehicle LV transmits a (compulsory) platooning release signal to the following vehicles FVs to check synchronization of the operations of the emergency situation mode. The controllers 170 of the following vehicles FVs operate automatic release function immediately after receiving a platooning releasing signal through the communication device 130. When the platooning is completely released after the automatic release function is operated, the controllers 170 of the following vehicles FVs transmit a message informing the fact to the leading vehicle LV. When receiving the platooning release completing messages from the following vehicles FVs in predetermined time after transmitting the platooning releasing signal, the controller 170 of the leading vehicle LV automatically forms a platoon again. That is, the leading vehicle LV finally approves the platoon formed in advance.

Although it has been disclosed above that the following vehicles FVs detect the functional operation time points and the vehicle-to-vehicle distances from the preceding vehicles according to the checking command of the leading vehicle LV and transmit the detected functional operation time points and the vehicle-to-vehicle distances to the leading vehicle LV, the present disclosure is not limited thereto but the present disclosure may be realized such that the following vehicles FVs operate specific functions according to a checking command when the leading vehicle LV transmits the functional operation time point information together with a checking command to the following vehicles FVs, and determine whether the synchronization of the functional operations of the host vehicles FVs is normal to provide the determination result to the leading vehicle LV. For example, after operating specific functions according to a checking command of the leading vehicle LV and detecting the operation time points of the corresponding function and the vehicle-to-vehicle distances from the preceding vehicles, the following vehicles FVs determine whether the synchronization of the functional operations of the host vehicles FVs is normal based on the information on the functional operation time point of the leading vehicle LV, the detected functional operation time points of the host vehicles FVs, and the vehicle-to-vehicle distances from the preceding vehicles and provides the corresponding determination result to the leading vehicle LV.

In an exemplary embodiment, the vehicle controller 160 may be connected as separate devices or embedded in the controller 170 which may be an electronic control unit (ECU).

In the various embodiments disclosed herein, including embodiments of the platooning control apparatus 100 and/or elements thereof, can be implemented using one or more processors coupled to a memory (or other non-transitory machine readable recording medium) storing computer-executable instructions for causing the processor(s) to perform the functions described above including the functions described in relation to the input device 110, the detect 120, the communication device 130, the storage 140, the display 150, the vehicle controller 160, and/or the controller 170.

Figure 3:
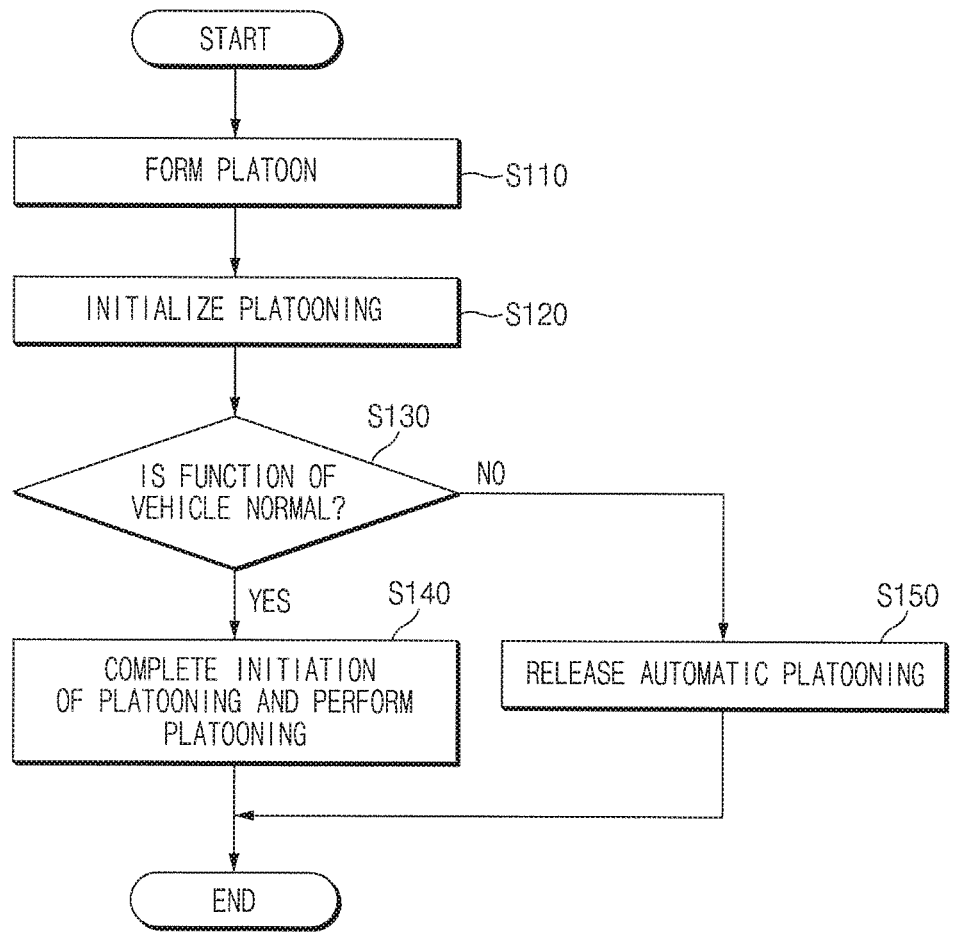
FIG. 3 is a flowchart illustrating a method for controlling platooning according to an embodiment of the present disclosure.
Figure 4:
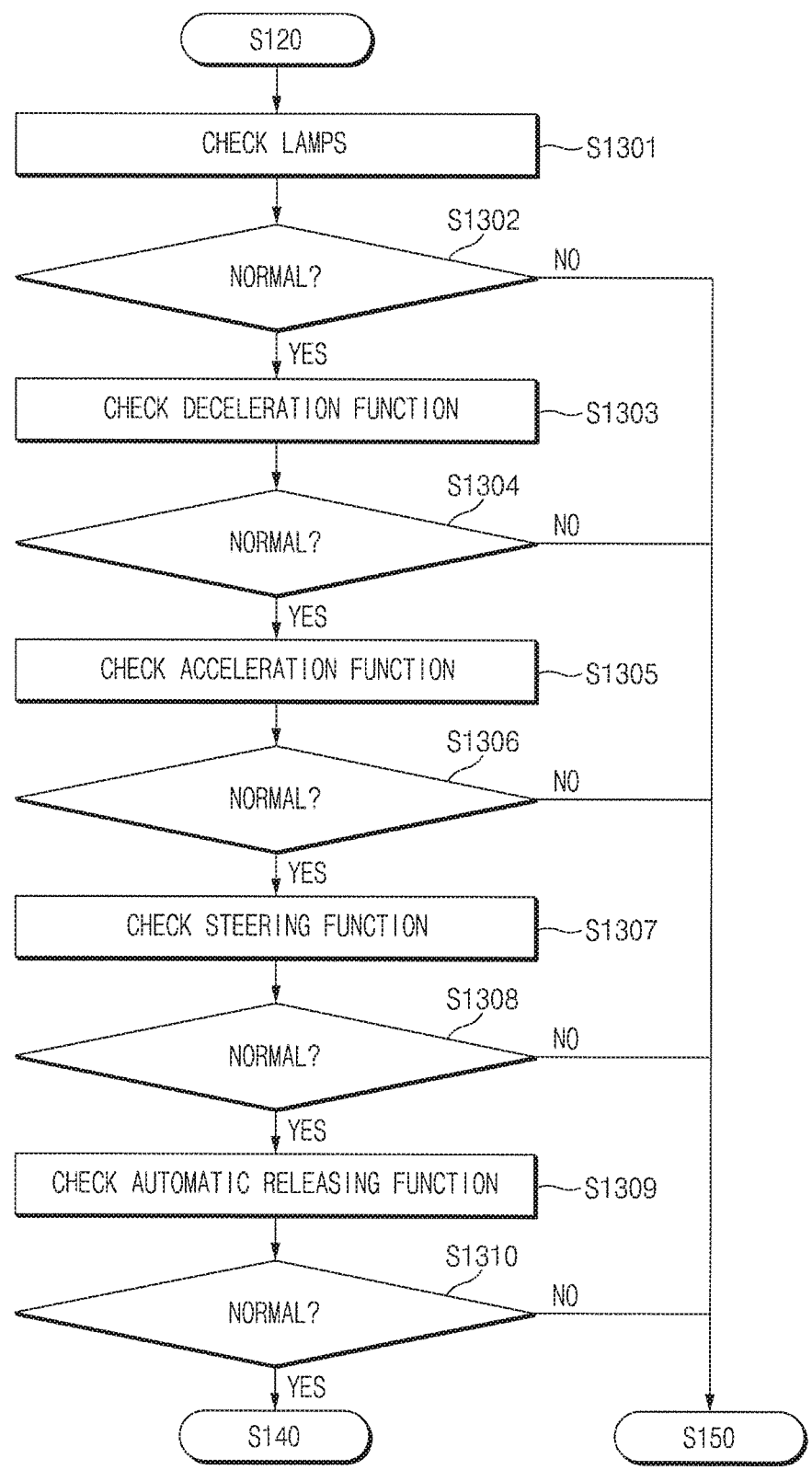
FIG. 4 is a flowchart illustrating a process of checking a function of the vehicle illustrated in FIG. 3.

FIG. 3 is a flowchart illustrating a method for controlling platooning according to an embodiment of the present disclosure. FIG. 4 is a flowchart illustrating a process of checking synchronization of the functional operation of the vehicle illustrated in FIG. 3.

As illustrated in FIG. 3, the control server 10 collects vehicle information from the vehicles that requested a platooning service and forms a platoon based on the vehicle information (S110). When the platoon is completely formed, the control server 10 transmits platooning approval information and information on the foamed platoon to the platooning vehicles (the leading vehicle and the following vehicles). For example, the control server 10 forms two or more vehicles, of which the point of departures and the destinations are the same as one platoon (group). Then, the control server 10 may select a leading vehicle (a leader vehicle LV) in the formed platoon.

If the platoon is completely formed, the controller 170 of the leading vehicle LV initiates platooning (S120). That is, the controller 170 of the leading vehicle LV starts platooning initiating mode. Here, the initiation of the platooning refers to synchronization of the functional operations of all the vehicles (platooning vehicles) in the formed platoon.

The controller 170 of the leading vehicle LV identifies normality by checking the synchronization of the functional operations of all the platooning vehicles (S130). That is, the controller 170 of the leading vehicle LV initializes platooning for all the platooning vehicles.

Hereinafter, a process of initiating platooning (checking synchronization of the functional operation of the vehicle) by the leading vehicle LV will be described in more detail with reference to FIG. 4.

Referring to FIG. 4, the controller 170 of the leading vehicle LV checks the lamps of all the platooning vehicles (S1301). Then, the controller 170 of the leading vehicle transmits a checking command indicating operations of the lamps, such as the turn signal lamps and the stop lamps, to the following vehicles FVs. When receiving checking commands through the communication device 130, the controllers 170 of the following vehicles FVs operate the lamps, such as the turn signal lamps and the stop lamps, by controlling the lamp controllers 161 and check the operation time points of the lamps, whether the operations has been completed, and/or normal operations. The controller 170 checks the operation time points and the normality of the lamps, and transmits the corresponding checking result to the leading vehicle LV.

The controller 170 of the leading vehicle LV determines whether the lamps of the following vehicles FVs are normal based on the lamp checking results provided from the following vehicles FVs (S1302). For example, after transmitting a lamp checking command, the controller 170 of the leading vehicle LV identifies whether the checking results (notifications of completion of the operations) are received from the following vehicles FVs within a predetermined time.

The controller 170 of the leading vehicle LV checks the deceleration functions of all the platooning vehicles when the lamp checking results are normal (S1303). The controller 170 of the leading vehicle LV rapidly decelerates the driving speed of the host vehicle LV at a predetermined deceleration by controlling the braking controller 163. Thereafter, the controller 170 of the leading vehicle LV determines whether the deceleration functions of the following vehicles FV are normal based on the deceleration time points (deceleration operation time points) of the following vehicles FVs and the vehicle-to-vehicle distances between the following vehicles FVs and the preceding vehicles according to the deceleration of the leading vehicle LV (S1304).

For example, when the leading vehicle LV decelerates the speed (driving speed) of the vehicle at a deceleration of 3 $m/s^2$, the following vehicles FVs decelerates by controlling the braking controller 163 as the leading vehicle LV decelerates. Then, the following vehicles FVs detect the deceleration time points and the vehicle-to-vehicle distances from the preceding vehicles through the detector 120 and provide them to the leading vehicle LV. The leading vehicle LV identifies whether the deceleration time points and the vehicle-to-vehicle distances received from the following vehicles FVs are within, allowable ranges, and determines normality when the deceleration time points and the vehicle-to-vehicle distances are within allowable ranges. For example, the leading vehicle LV determines normality when the deceleration time points of the following vehicles FVs are within 50 ms from the braking time point of the leading vehicle LV and the vehicle-to-vehicle distances from the preceding vehicles are more than 5 m.

When the synchronization of the deceleration operations of the following vehicles FVs is normal, the controller 170 of the leading vehicle LV checks the acceleration functions of all the platooning vehicles (S1305). Then, the controller 170 of the leasing vehicle LV accelerates the driving speed of the leading vehicle LV at a predetermined acceleration. The controller 170 of the leading vehicle LV determines normality of the acceleration functions of the following vehicles FVs based on the acceleration time points of the following vehicles FVs and the vehicle-to-vehicle distances from the preceding vehicles according to the acceleration of the leading vehicle LV (S1306).

For example, when the leading vehicle LV accelerates the speed of the vehicle at an acceleration of 3 $m/s^2$, the following vehicles FVs accelerate the speeds of the host vehicles as the leading vehicle LV accelerates by controlling the engine controller 162. Then, the following vehicles FVs detect the acceleration time points and the vehicle-to-vehicle distances of the host vehicles FVs from the preceding vehicles through the detector 120, and transmit the detected acceleration time points and the vehicle-to-vehicle distances to the leading vehicle LV. The leading vehicle LV receives the acceleration time points and the vehicle-to-vehicle distances detected by the following vehicles FVs and determines that the synchronization of the acceleration operation is normal when the detected acceleration time points are within 200 ms from the acceleration time point of the leading vehicle LV and the detected vehicle-to-vehicle distances are more than 5 m.

When the acceleration operations of the following vehicles FVs are normal, the controller 170 of the leading vehicle LV checks the steering functions of all the platooning vehicles (S1307). The controller 170 of the leading vehicle LV travels while slowly performing a steering operation in an S shape in the driving lane by controlling the steering controller 164. Then, the controller 170 of the leading vehicle LV identifies (checks) the steering responsiveness of the following vehicles (FVs). That is, the controller 170 determines whether the steering functions of all the platooning vehicles are normal by identifying whether the following vehicles FVs travel in an S shape. That is, when the leading vehicle LV controls steering according to a predetermined steering angle, the following vehicles FVs controls the steering of the vehicle by controlling the steering controller 164 according to the steering of the leading vehicle LV and detects a steering time point and a steering angle through the detector 120. The leading vehicle LV receives the steering time points and the steering angles detected from the following vehicles FVs, and compares them with the steering time point and the steering angle of the leading vehicle LV to identify whether the differences are within allowable ranges.

When the checking results for the steering functions of all the platooning vehicles are normal, the controller 170 of the leading vehicle LV checks the automatic release function of all the platooning vehicles in an emergency situation (S1390). The controller 170 of the leading vehicle LV transmits a platooning releasing signal to the following vehicles FVs, and the controllers 170 of the following vehicles FVs operate the automatic release function immediately after a platooning release signal from the leading vehicle LV. That is, the controllers 170 of the following vehicles FVs release a platooning mode set to the driving modes of the host vehicles FVs and converts the mode to an autonomous driving mode immediately after receiving a platooning release command through the communication device 130. When the platooning is completely released through the automatic release function, the controllers 170 of the following vehicles FVs transmit a message informing the completion of the release of the platooning to the leading vehicle LV. The controller 170 of the leading vehicle LV determines normality when receiving platooning release completion messages from the following vehicles FV in a predetermined time (e.g., 2 seconds).

The controller 170 of the leading vehicle LV completes initialization of platooning when the checking result is normal and performs platooning (S140). Then, the controller 170 of the leading vehicle LV transmits a message informing the completion of the initialization of platooning to the following vehicles FVs, and forms the released platoon again. That is, the leading vehicle LV finally approves the platoon. The controllers 170 of the leading vehicle LV and the following vehicles FVs output a notification informing completion of the initialization of the platooning on the display 150.

The controller 170 of the leading vehicle LV automatically releases the platooning by transmitting the platooning releasing command to the following vehicles FVs when any one function, is abnormal during the checking of the function of the vehicle (S150). Further, the controller 170 of the leading vehicle LV transmits the reason for the release of the platooning to the following vehicles FVs and shares the reason. The controllers 170 of the leading vehicle LV and the following vehicles FVs output and display the reason for the release of the platooning on the displays 150. For example, the controllers 170 of the leading vehicle LV and the following vehicles FVs display on the displays 150 the reason for the failure of the initialization of the platooning, that is, "Platooning is released due to the failure of the deceleration function" (vehicle FV1, vehicle number 1456)" when the initialization of the platooning fails because the checking result for the function of the vehicle is abnormal.

The present disclosure may prevent an accident that may occur due to an error of a functional operation of a vehicle during platooning in advance by checking synchronization of the functional operations of the platooning vehicles when a platoon for platooning is formed.

The above description is a simple exemplification of the technical spirit of the present disclosure, and the present disclosure may be variously corrected and modified by those skilled in the art to which the present disclosure pertains without departing from the essential features of the present disclosure. Therefore, the disclosed embodiments of the present disclosure do not limit the technical spirit of the present disclosure but are illustrative, and the scope of the technical spirit of the present disclosure is not limited by the embodiments of the present disclosure. The scope of the present disclosure should be construed by the claims, and it will be understood that all the technical spirits within the equivalent range fall within the scope of the present disclosure.

What is claimed is:

1. A platooning control apparatus comprising:
    a communication device configured to perform communication between a host vehicle and following vehicles, which follow the host vehicle, in a platoon; and
    a controller configured to control platooning by requesting checking of functions of the following vehicles through the communication device after the platoon is formed, by identifying whether a specific function, among the checked functions, of the following vehicles operate, and by determining whether the platoon is maintained according to an identification result,
    wherein the controller checks an operation time point of the specific function of each of the following vehicles for synchronization of functional operation of the following vehicles.

2. The platooning control apparatus of claim 1, wherein the specific function includes a function of operating lamps, a function of deceleration, a function of acceleration, a function of steering, and an automatic platooning releasing function.

3. The platooning control apparatus of claim 2, wherein the controller determines whether an operation of a function of each of the following vehicles is normal, by transmitting a lamp operation command to each of the following vehicles through the communication device and by identifying a lamp operation start time of each of the following vehicles according to the lamp operation command.

4. The platooning control apparatus of claim 3, wherein the controller determines whether the operation of the function of each of the following vehicles is normal, by decelerating the host vehicle by controlling a vehicle controller of the host vehicle, and by identifying whether a deceleration start time of each of the following vehicles is a reference time and whether each of vehicle-to-vehicle distances between the host vehicle and each of the following vehicles is within a reference distance range.

5. The platooning control apparatus of claim 4, wherein the controller determines whether the operation of the function of each of the following vehicles is normal, by accelerating the host vehicle by controlling the vehicle controller, and by identifying whether an acceleration start time of each of the following vehicles is a reference time and whether each of vehicle-to-vehicle distances between the host vehicle and each of the following vehicles is within a reference distance range.

6. The platooning control apparatus of claim 5, wherein the controller determines whether the operation of the function of each of the following vehicles is normal, by controlling steering of the host vehicle through the vehicle controller and identifying steering responsiveness of each of the following vehicles to the steering control of the host vehicle.

7. The platooning control apparatus of claim 6, wherein the controller transmits a platooning releasing command to the following vehicles through the communication device and determines whether the operation of the function of each of the following vehicles is normal according to whether completion of release of the platooning is received from each of the following vehicles within a predetermined time.

8. The platooning control apparatus of claim 7, wherein the controller transmits the platooning releasing command when the operation of the function of each of the following vehicle is abnormal, and transmits a reason for the release of the platooning with the following vehicles.

9. The platooning control apparatus of claim 8, further comprising:
    a display configured to output various information,
    wherein the controller controls the display to display the reason for the release of the platooning.

10. The platooning control apparatus of claim 1, wherein the communication device uses vehicle-to-everything (V2X) communication.

11. A method for controlling platooning, the method comprising steps of:
    starting, by a controller, a platooning initializing mode after a platoon is formed between a host vehicle and the following vehicles which follow the host vehicle;
    requesting, by the controller, checking of functions of the following vehicles in the platooning initializing mode and identifying whether a specific function among the checked functions of the following vehicles operates; and controlling, by the controller, platooning by determining whether the platoon is maintained according to an identification result of whether the specific function of the following vehicles operates, wherein the step of identifying whether a specific function among the checked functions of the following vehicles operates includes checking an operation time point of the specific function of each of the following vehicles for synchronization of functional operation of the following vehicles.

12. The method of claim 11, wherein the specific function include a function of operating lamps, a function of deceleration, a function of acceleration, a function of steering, and an automatic platooning releasing function.

13. The method of claim 12, wherein the step of identifying whether a specific function among the checked functions of the following vehicles operates includes:

determining whether an operation of a function of each of the following vehicles is normal, by transmitting a lamp operation command to each of the following vehicles through the communication device and by identifying a lamp operation start time of each of the following vehicles according to the lamp operation command.

14. The method of claim 13, wherein the step of identifying whether a specific function among the checked functions of the following vehicles operates includes:

determining whether the operation of the function of each of the following vehicles is normal, by decelerating the host vehicle by controlling a vehicle controller of the host vehicle, and by identifying a deceleration start time of each of the following vehicles is a reference time and whether each of vehicle-to-vehicle distances between the host vehicle and each of the following vehicles is within reference distance range.

15. The method of claim 14, wherein the step of identifying whether a specific function among the checked functions of the following vehicles operates includes:

determining whether the operation of the function of each of the following vehicles is normal, by accelerating the host vehicle by controlling a vehicle controller, and by identifying whether an acceleration start time of each of the following vehicles is a reference time and whether each of vehicle-to-vehicle distances between the host vehicle and each of the following vehicles is within a reference distance range.

16. The method of claim 15, wherein the step of identifying whether a specific function among the checked functions of the following vehicles operates includes:

determining whether the operation of the function of each of the following vehicles is normal, by controlling steering of the host vehicle through the vehicle controller and identifying steering responsiveness of each of the following vehicles to the steering control of the host vehicle.

17. The method of claim 16, wherein the step of identifying whether a specific function among the checked functions of the following vehicles operates includes:

transmitting a platooning releasing command to each of the following vehicles through the communication device and then determining whether the operation of the function of each of the following vehicles is normal according to whether completion of release of the platooning is received from each of the following vehicles within a predetermined time.

18. The method of claim 17, further comprising:

after the step of identifying whether a specific function among the checked functions of the following vehicles operates, releasing platooning by transmitting the platooning releasing command to each of the following vehicles when the operation of the function of each of the following vehicles is abnormal.

19. The method of claim 18, wherein the step of releasing the platooning includes:

transmitting a reason for the release of the platooning, when the platooning releasing command is transmitted, to the following vehicles.

20. The method of claim 19, wherein the step of releasing the platooning includes:

displaying the reason for the release of the platooning on a display.

* * * * *